United States Patent [19]
Larson et al.

[11] Patent Number: 6,042,465
[45] Date of Patent: Mar. 28, 2000

[54] METHOD AND APPARATUS FOR PEELING CRAWFISH

[75] Inventors: Michael C. Larson, New Orleans, La.; Andrew L. Johnston, Bowling Green, Ky.

[73] Assignee: Administrators of the Tulane Educational Fund, New Orleans, La.

[21] Appl. No.: 09/152,166

[22] Filed: Sep. 11, 1998

Related U.S. Application Data

[60] Provisional application No. 60/058,723, Sep. 12, 1997.

[51] Int. Cl.[7] .................................................. A22C 29/02
[52] U.S. Cl. .................................... 452/9; 452/1; 452/19
[58] Field of Search .................................. 452/9, 1, 2, 4, 452/5, 19

[56] References Cited

U.S. PATENT DOCUMENTS

| | | |
|---|---|---|
| 2,660,754 | 12/1953 | Roshko . |
| 2,772,442 | 12/1956 | Matter . |
| 2,845,654 | 8/1958 | Deal .............................. 452/5 |
| 2,884,657 | 5/1959 | Miller ........................... 452/5 |
| 3,221,363 | 12/1965 | Couret . |
| 3,278,983 | 10/1966 | Martin . |
| 3,359,595 | 12/1967 | Anderson et al. ............ 452/9 |
| 3,758,921 | 9/1973 | Ingalls . |
| 3,789,460 | 2/1974 | Ingalls . |
| 4,004,321 | 1/1977 | Harrison ....................... 452/9 |
| 4,019,224 | 4/1977 | Amaria et al. . |
| 4,121,322 | 10/1978 | Rutledge . |
| 4,196,495 | 4/1980 | Mestayer et al. . |
| 4,236,277 | 12/1980 | Rudy et al. . |
| 4,236,877 | 12/1980 | Curtis . |
| 4,385,422 | 5/1983 | Ingalls et al. . |
| 4,524,490 | 6/1985 | Newville . |
| 4,531,261 | 7/1985 | Sanaka ......................... 452/4 |
| 4,785,502 | 11/1988 | Howard . |
| 4,817,243 | 4/1989 | Esposito . |
| 4,912,810 | 4/1990 | Laughlin et al. . |
| 4,928,352 | 5/1990 | Thibodeaux . |
| 5,055,085 | 10/1991 | Thibodeaux . |
| 5,340,353 | 8/1994 | Barlow ......................... 452/9 |

Primary Examiner—Willis Little
Attorney, Agent, or Firm—Garvey, Smith, Nehrbass & Doody, L.L.C.

[57] ABSTRACT

A method and apparatus for peeling crawfish or crayfish includes a machine frame that supports a peeling mechanism, preferably in the form of a pair of rollers rotatably mounted to the frame in a position that receives crawfish one at a time from a conveyor. The conveyor transports the crawfish to be peeled, the conveyor having first and second end portions. In the preferred embodiment, the conveyor includes multiple conveyor belts, at least two of which are positioned one above the other below the crawfish for sandwiching the crawfish therebetween to support them during use. The conveyor in combination with an alignment member straightens the tail portion of the crawfish and delivers the crawfish to the peeling mechanism. The alignment member can include an inclined plate or ramp that gradually extends the tail of the crawfish as the conveyor transports the crawfish toward the peeling mechanism.

30 Claims, 8 Drawing Sheets

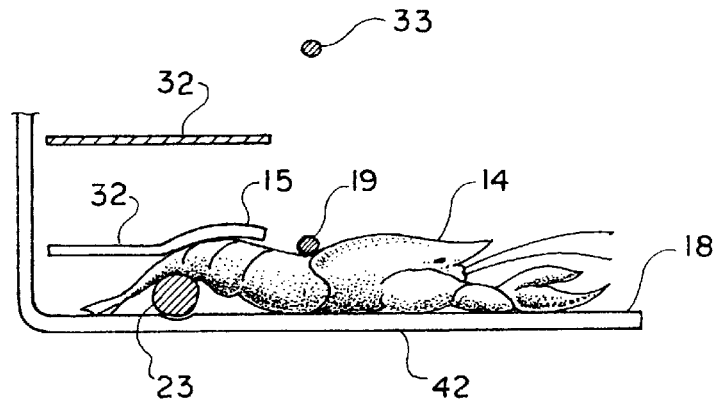
F I G. 3
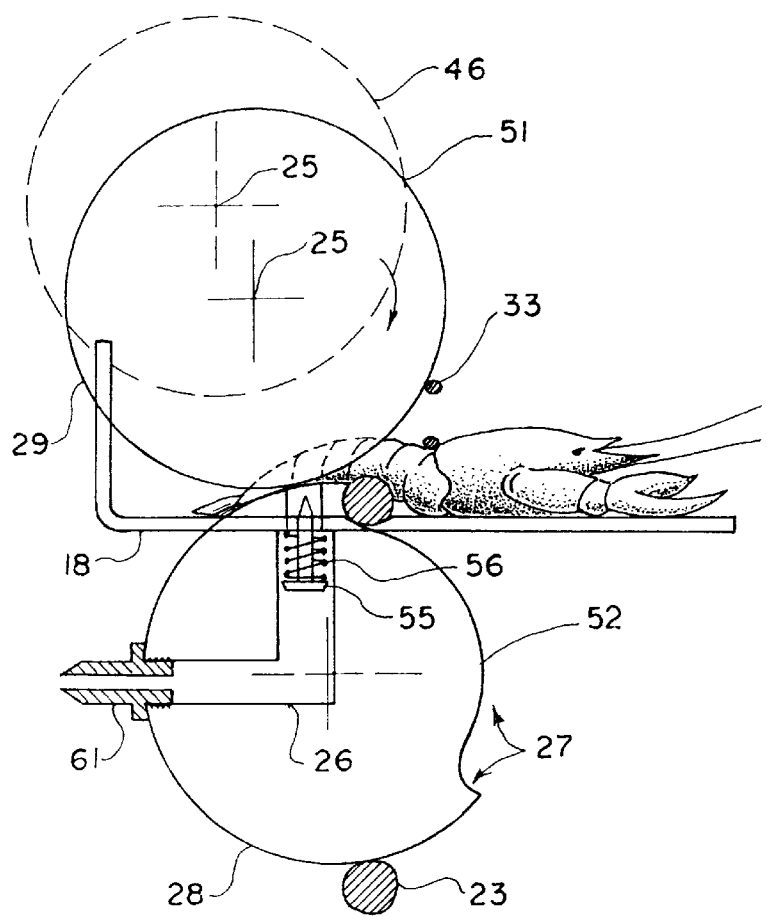
F I G. 4

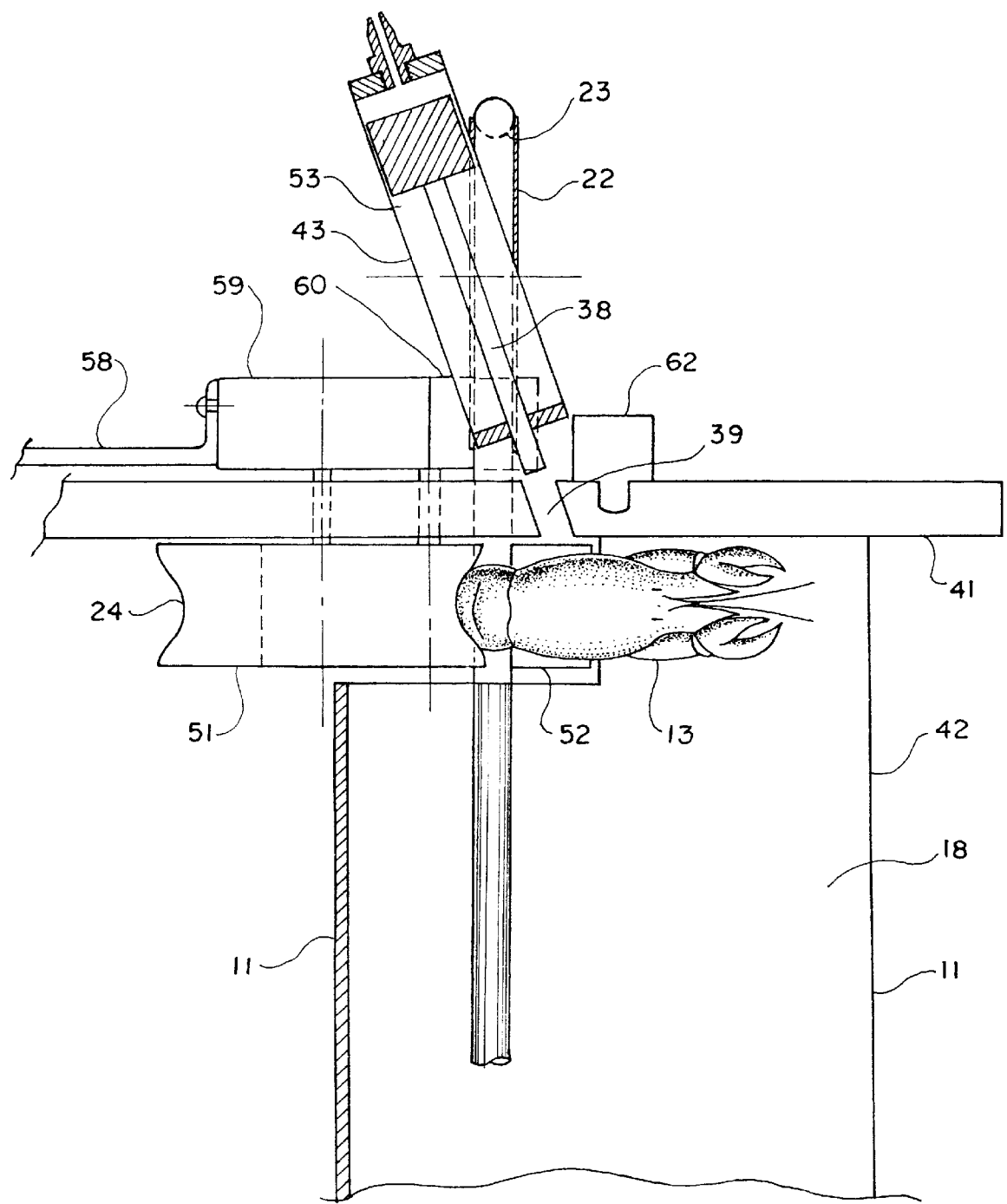
F I G. 5

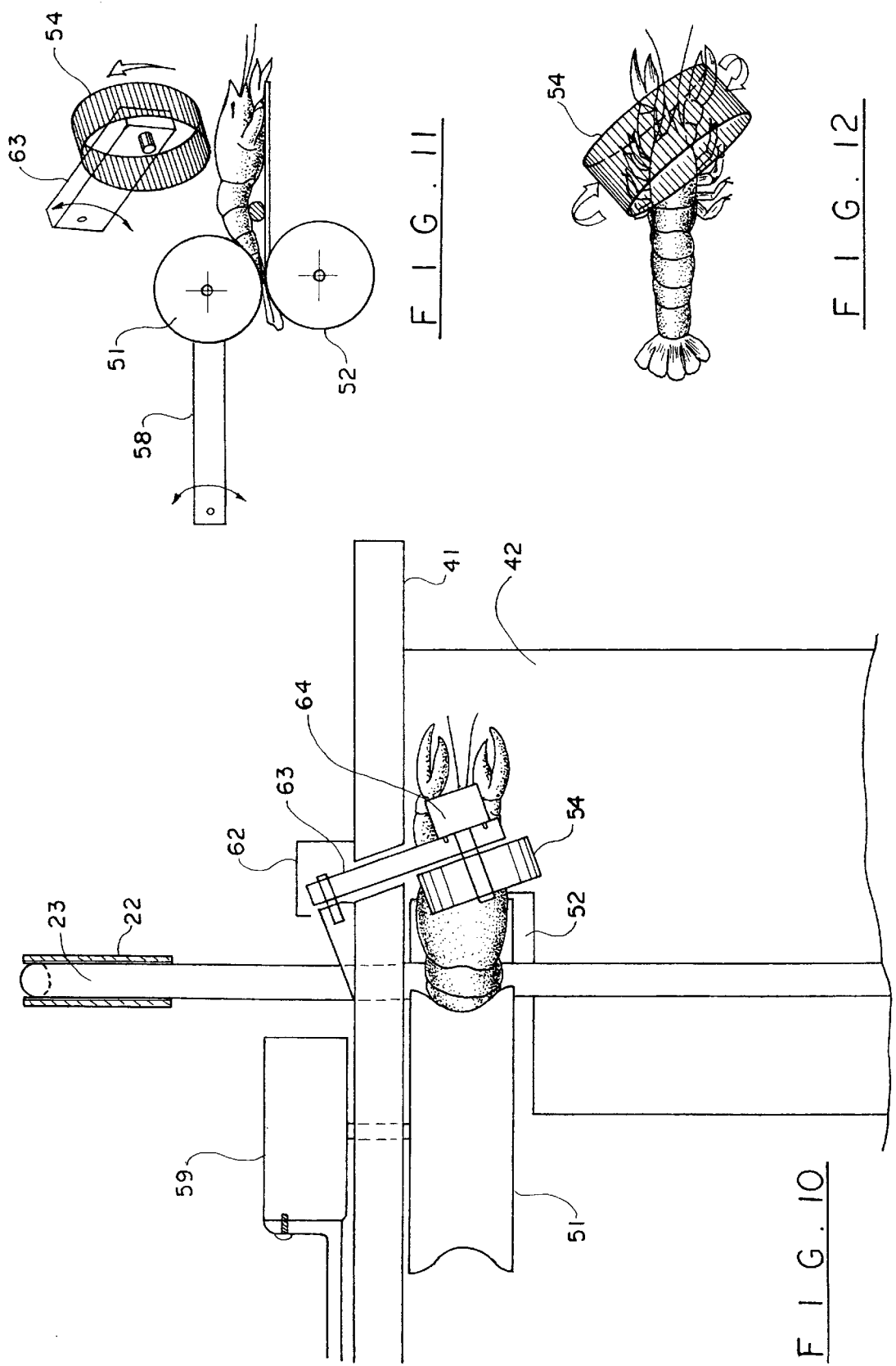

METHOD AND APPARATUS FOR PEELING CRAWFISH

CROSS-REFERENCE TO RELATED APPLICATIONS

Priority of U.S. Provisional Patent Application Ser. No. 60/058,723, filed Sep. 12, 1997, now abandoned, is hereby claimed. It and its attachments are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to seafood processing and more particularly to an improved method and apparatus for processing crustacea such as those known as crayfish or crawfish. Even more particularly, the present invention relates to an improved crawfish peeling apparatus that simultaneously conveys crawfish to a peeling mechanism and elongates the tail portion of the crawfish, flattening and straightening the tail before it is grabbed by a peeling mechanism that removes the edible tailmeat.

2. General Background of the Invention

The crawfish industry (primarily located in Louisiana and Texas) has only existed for a few decades. Before recent times, crawfish were eaten as they were poached out of the wild, particularly in the Atchafalaya Basin, west of Baton Rouge, La. In the 1950's, families began turning this tradition pastime into a business, gathering hundreds of pounds of crawfish at a time and selling them. In time, the popularity of dishes featuring crawfish led to a demand for a tailmeat product which would save buyers, particularly restaurant owners, the expense of having to labor over the boiling and peeling of the entire crawfish. Several businesses met this demand, and now many small businesses boil, peel and package crawfish tailmeat that is available in the consumer market either frozen or fresh. Some of these operations have developed into international businesses grossing millions of dollars per year.

In the past view years, this industry has experienced a great deal of adjustment as Chinese producers have entered the crawfish markets. These Chinese businesses are able to sell a high-quality product at greatly reduced prices. While many observers view this change as a major economic catastrophe, there are a few reasons that this competition could be positive in the long term. Firstly, this cheaper product has entered markets that were formerly geographically prohibitively expensive. Major restaurants have added crawfish dishes to their menus nationwide. The total volume of crawfish sales worldwide is many times greater than it was prior to the Chinese entering the market. It follows, then, that should Louisiana and Texas crawfish producers find a way to become competitive in this new larger market, they stand to significantly increase sales.

Thus, there presently exists a need for a mechanism that can effectively process large volumes of crawfish to remove the edible tailmeat from the carapace.

Several patents have issued for crawfish peeling devices. Some of those are listed below:

U.S. Pat. Nos. 4,121,322, 4,196,495, 4,236,877, 4,385,422, 4,524,490, 4,817,243, 4,912,810, 4,928,352, and 5,055,085.

BRIEF SUMMARY OF THE INVENTION

The present invention provides an improved crawfish peeling apparatus that includes a machine frame with a conveyor assembly and a peeling mechanism mounted on the frame. The conveyor assembly transports crawfish to be peeled to the peeling mechanism, the conveyor having first and second end portions.

The conveyor has a moving portion that enables crawfish that are placed on the conveyor to travel to the peeling mechanism.

In the preferred embodiment, the peeling mechanism includes a pair of rollers.

In the preferred embodiment, the conveyor includes a plurality of different belts for transporting crawfish and a ramp for simultaneously straightening the tail section of the crawfish before it is to be peeled.

The ramp is part of an alignment member that aligns the crawfish tail with rollers of the peeling mechanism in a position that enables the rollers to easily grip and pinch the crawfish tail exoskeleton and discharge the edible meat product therefrom.

During use, the present invention provides an improved method that first transports the crawfish on a carrier belt that exploits the natural curvature of the exoskeleton. The crustacean hangs by its curved tail on the moving carrier belt.

The crawfish tail is pinched between the carrier belt and a primary stabilization belt, both of which are moving at the same speed. The two belts offer support as the crawfish is flattened, its tail being elongated as it travels on a ramp or inclined plate portion of the frame.

A secondary stabilization belt carries the crustacean into position against a support wall and in between upper and lower rollers that comprise the peeling mechanism.

A proximity sensor signals that the crawfish is in the proper peeling position. The upper roller positioner is actuated, then moves the upper roller swing arm downwardly to cause the upper roller to pinch the base of the tail between it and the lower roller. This action holds the tail steady during abdomen removal, referred to as deheading and during tailmeat removal.

Head removal (deheading) is accomplished by one or two alternate methods. A deheading piston is provided in one embodiment for pushing from the side in order to separate the head and tail portions from one another. This is accomplished as the tail section is gripped by the conveyor.

A deheading wheel can be used for removing the head from the tail portion of the crawfish. The deheading wheel is oriented at an angle so as to impart both a rotation about the longitudinal axis of the crustacean to twist the head, and a force along the longitudinal axis to pull the head off.

A shot of pressurized gas or liquid can be introduced through the lower roller pressure connection forcing a needle to penetrate the exoskeleton and cause the tailmeat to be ejected out of the tail of the exoskeleton (which is still clamped between the upper roller and the lower roller).

The upper roller and lower roller rotate together to eject the exoskeleton. Then these two rollers roll back to the ready position and move apart to receive the next crustacean.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a sectional view taken along lines 3—3 of FIG. 1 and 2;

FIG. 4 is a sectional elevational view taken along lines 4—4 of FIGS. 1 and 2;

FIG. 5 is a sectional view taken along lines 5—5 of FIG. 1 and 2;

FIG. 10 is a fragmentary view of an alternative embodiment of the apparatus of the present invention showing separation of the head and tail portions thereof;

FIG. 11 is another fragmentary view of an alternate embodiment of the apparatus of the present invention showing an alternate mechanism for separating the head and tail; and FIG. 12 is a top view of the alternate embodiment of FIGS. 10 and 11.

DETAILED DESCRIPTION OF THE INVENTION

Figure 1:
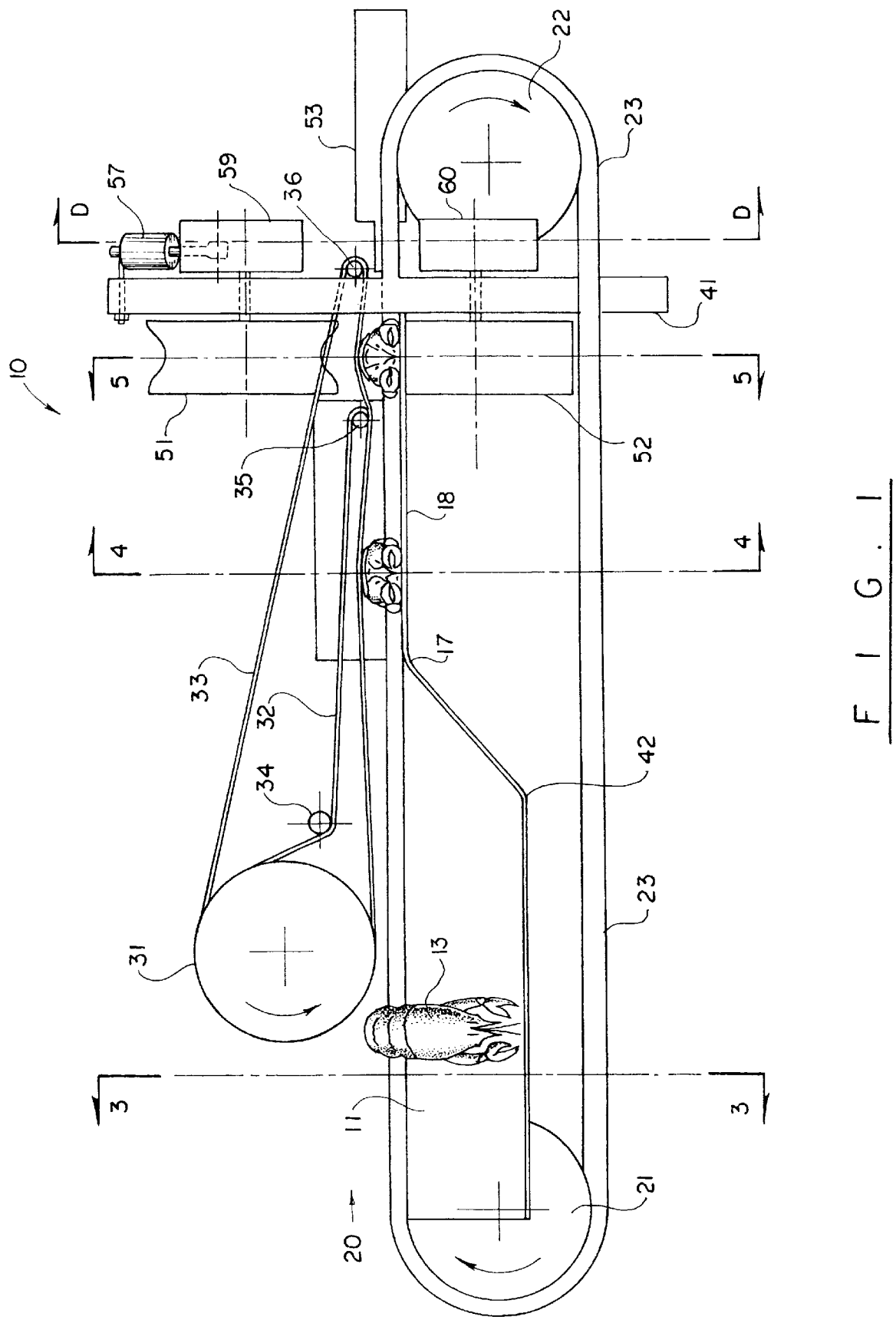
FIG. 1 is a front elevational view of the preferred embodiment of the apparatus of the present invention.
Figure 2:
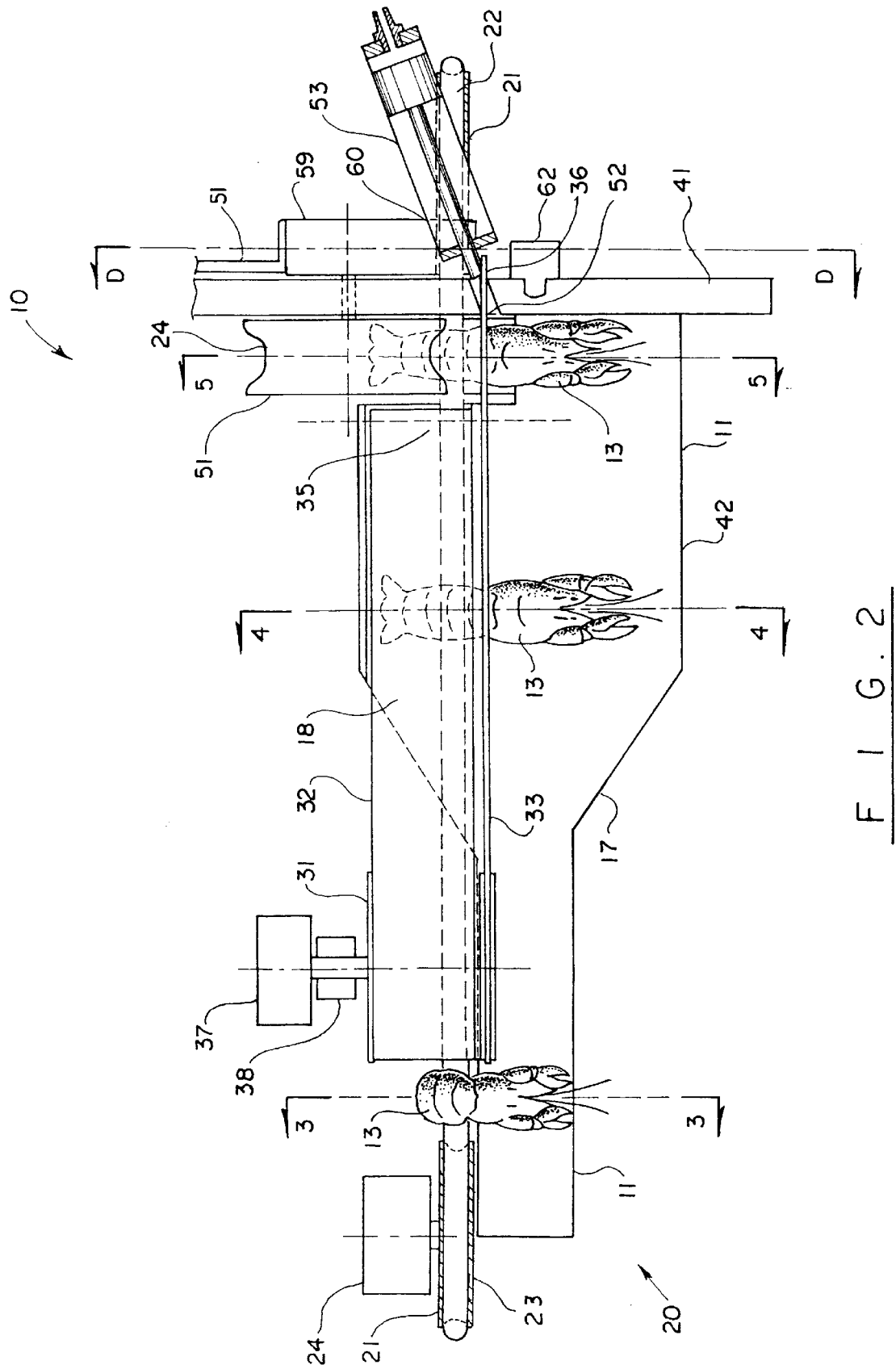
FIG. 2 is a top plan view of the preferred embodiment of the apparatus of the present invention.

In FIGS. 1–6, crawfish peeling apparatus 10 includes a frame 11 that supports a carrier belt 23. The carrier belt 23 is supported by a pair of spaced apart wheels 21, 22. The wheel 21 is a drive wheel. The wheel 22 is an idler wheel. A guide platform 17 that includes ramp 42 is supported by frame 11 at a position next the carrier belt 23 as shown in FIGS. 1 and 2.

Crawfish 13 are supported upon the carrier belt 23 in sequence so that they can be conveyed to a peeling apparatus that includes a pair of rollers 51, 52. The crawfish 13 each include a head section 14 and a tail section 15 connected at joint 19. After the crawfish 13 are cooked, they are typically peeled by separating the head section 14 from the tail section 15 at the joint 19. The crawfish 13 tail 15 is curved after cooling so that the curved tail can grip belt 23 (see FIGS. 1–2).

In the preferred embodiment, the frame 11 supports a conveyor system that includes carrier belt assembly 20, a primary stabilization belt 32 and a secondary stabilization belt 33. Belt drive wheel 31 supports the primary stabilization belt 32 and the secondary stabilization belt 33. A plurality of belt supports are also provided for supporting these two belts 32, 33. These additional supports comprise belt tensioner 34, belt idler 35 and belt idler 36.

Each of the upper and lower rollers 51, 52 that comprise the peeling mechanism are provided with an annular groove 24 as shown in FIGS. 1–2, 5–6. As the conveyor belt assembly 20 moves individual crawfish 13 toward rollers 51, 52 the crawfish 13 are gradually flattened as they engage ramp 42 that is a part of guide platform 17. Eventually, each crawfish 13 engages support wall 41 so that its movement is stopped. The wall 41 holds the crawfish 13 in between rollers 51, 52 and generally aligned with the grooves 24 thereon (see FIG. 1). Secondary belt 33 moves crawfish 13 beyond belt 32 to rollers 51, 52.

Head removal is accomplished with deheading piston 53 (FIGS. 5–6) or deheading wheel 54 (FIGS. 10–12). The deheading wheel 54 is oriented at an angle so as to impart both a rotation about one longitudinal axis of the crawfish 13 to twist the head 14, and a force along the longitudinal axis to pull the head 14 off.

Figure 8:
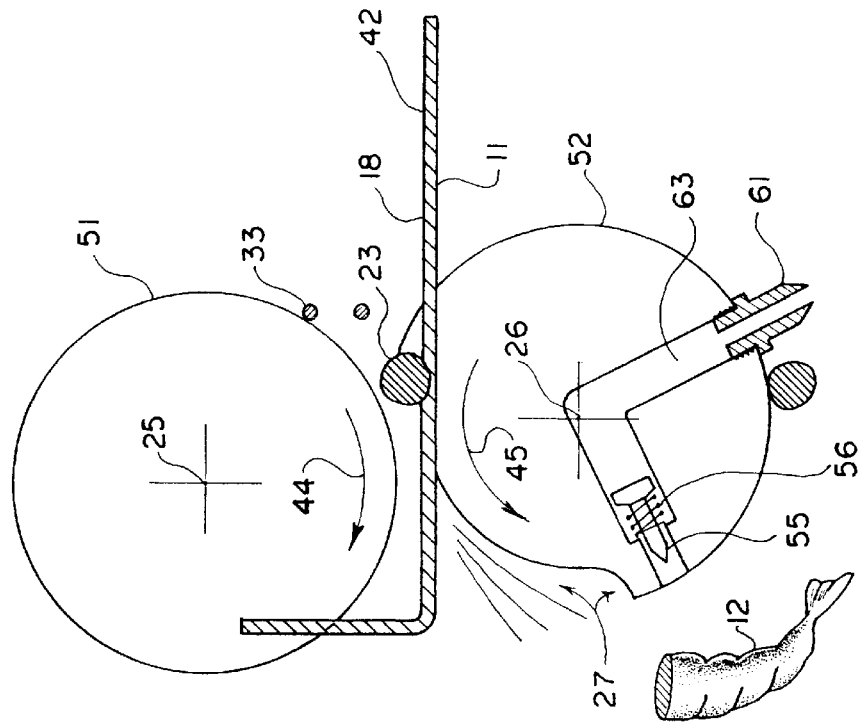
FIG. 8 is a partial elevational view of the preferred embodiment of the apparatus of the present invention showing the preferred means of disposal of the exoskeleton.
Figure 7:
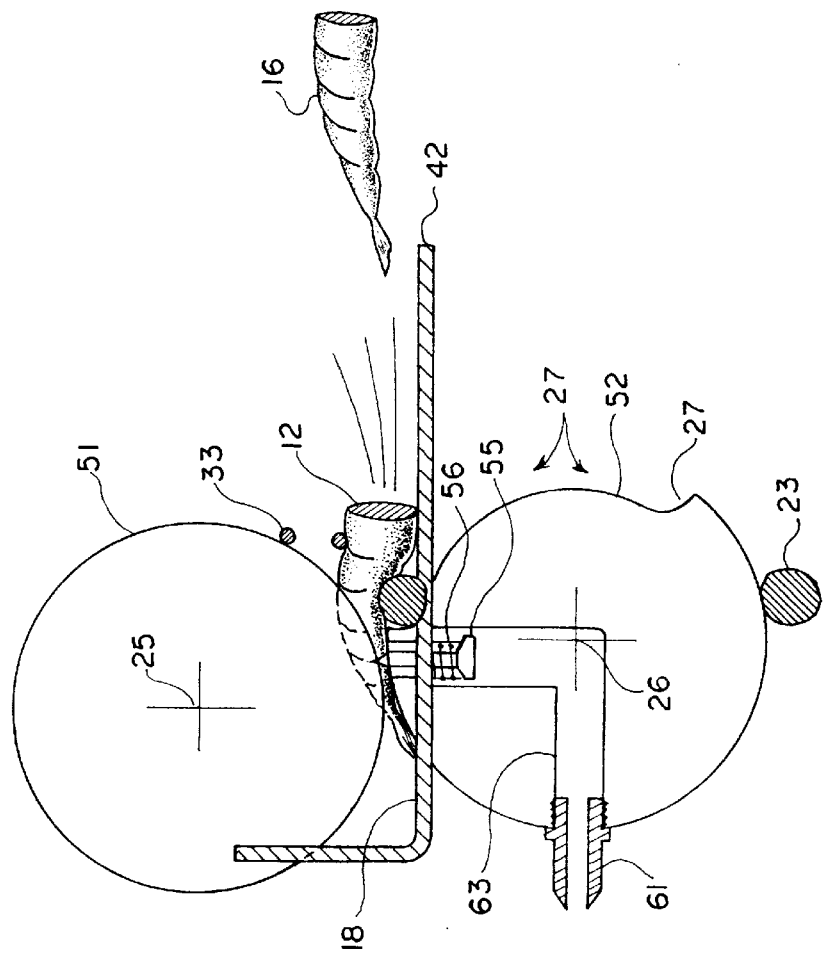
FIG. 7 is a fragmentary elevational view of the preferred embodiment of the apparatus of the present invention showing extraction of the tailmeat from the crawfish carapace during use.

After the crawfish 13 pass through ramp 42, they are flattened and the tail section 15 is elongated. Crawfish 13 travel upon flat surface 18 of frame 11 as shown in FIGS. 3–4 and 7–8. The centers of rotation 25, 26 of rollers 51, 52 are shown in FIGS. 7 and 8 when the rollers 51, 52 are in a peeling position that engages the tail section 15 of the crawfish 13. The lower roller 52 provides a peripheral recess 27 that extends about 120 degrees about the center of rotation 26 of the lower roller 52 as shown in FIGS. 4 and 7–8.

The combination of carrier belt 23, primary belt 32 and secondary belt 33 with peripheral recess 27 provides an indexing that correctly aligns the crawfish tail 15 with the peeling rollers 51, 52 as shown in FIGS. 4 and 7–8. The secondary stabilization belt 33 (see FIGS. 3–4) carries the crustacean 13 into position against the support wall 41 and between the upper roller 51 and lower roller 52. Proximity sensor 62 signals that crustacean is in the proper position (see FIG. 10). The upper roller positioning actuator 57 moves the upper roller swing arm 58 downward to cause the upper roller 51 to pinch the base of the tail 15 between it and the lower roller 52 (see FIG. 9). This holds the tail 15 steady during abdomen removal, referred to as "deheading", and during tailmeat removal. The recess 27 enables the belt 23 to stay in close proximity to the periphery of the lower roller 52 so that belt 23 properly places the crawfish tail 15 near the rollers 51, 52.

Arrows 44, 45 in FIG. 8 show the direction of rotation of the respective peeling rollers 51, 52 after the tailmeat 16 has been extracted from tail section 15 exoskeleton 12.

Figure 9:
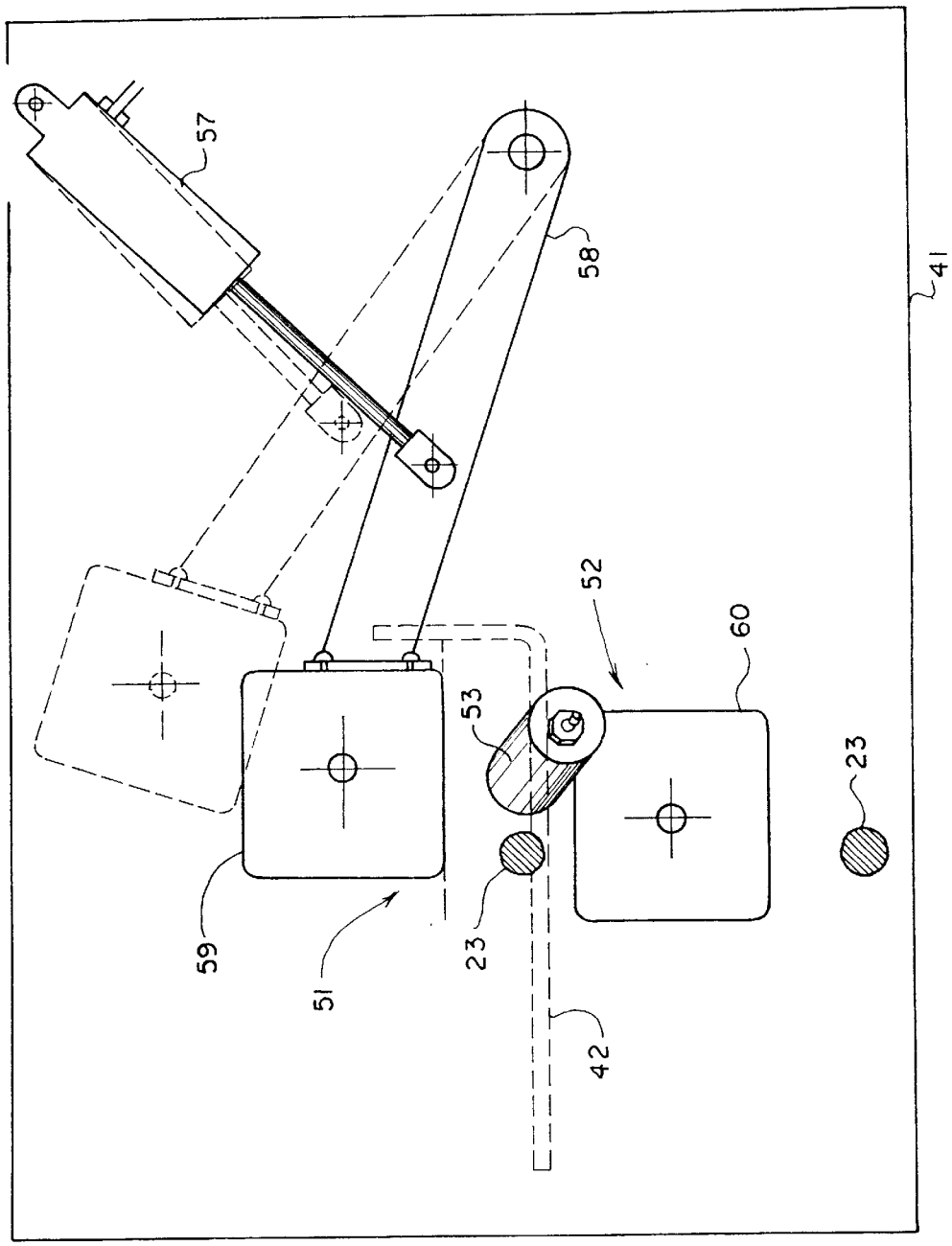
FIG. 9 is a fragmentary elevational view of the preferred embodiment of the apparatus of the present invention.

The rollers 51, 52 are moveable up and down relative to one another. Preferably, the upper roller 51 moves relative to the lower roller 52 as shown in FIGS. 4 and 9, the lower roller 52 being elevationally fixed. In FIG. 4, the numeral 28 indicates that fixed elevational position of lower roller 52 while the number 29 indicates the lower (peeling) elevational position of upper roller 51. Numeral 46 indicates the elevational position of the upper roller 51. The roller 51 moves into the position shown by number 29 in FIG. 4 during a peeling of the crawfish 13. Roller 51 returns to the upper position 46 in FIG. 4 to allow the next crawfish 13 to be transported into peeling position. Up and down movement of the upper roller 51 enables the upper roller 51 to register its groove 24 upon the tail 15 section of the crawfish 13 before peeling occurs.

Figure 6:
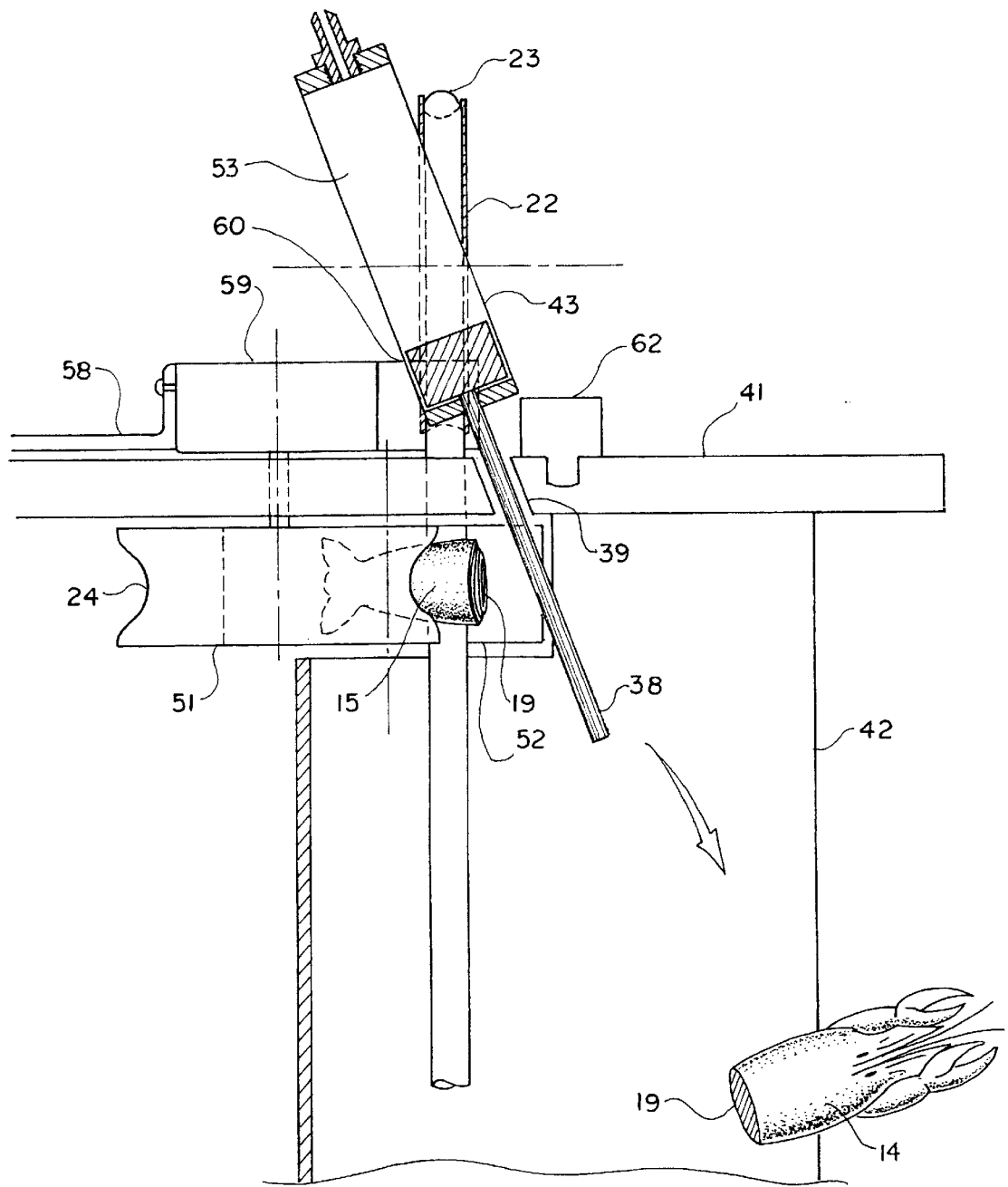
FIG. 6 is a partial view of the preferred embodiment of the apparatus of the present invention showing head removal during use.

In FIGS. 5–6 there can be seen a mechanism for removing the head section 14 of the crawfish 13 from the tail section 15 at joint 19. The mechanism includes a de-heading piston 53 that can be air operated, for example, having a push rod 38 that moves into an extended position as shown in FIG. 6. The pushrod 42 extends relative to barrel 43 of piston 53 to separate head section 14 from tail section 15. The extended position of pushrod 38 is shown in FIG. 6. The retracted position of pushrod 38 is shown in FIG. 5. Pushrod 38 passes through aperture 39 in support wall 41.

In FIGS. 7–8, a shot of pressurized gas or liquid can be introduced as a means of extracting tail meat 16, when introduced through lower roller 52 pressure connection 61. This action forces a needle 55 to penetrate exoskeleton 12 which is clamped between upper roller 51 and lower roller 52. Spring 56 returns needle 55 to a retracted position. A source of pressure can be connected to needle air feed tube 63 at connection 61.

The upper roller 51 and lower roller 52 rotate together to eject the exoskeleton 12. Rollers 51, 52 then roll back to the original "ready" position and move apart (see FIG. 4) to receive the next crawfish 13. Rollers 51, 52 are driven by respective motor drives 59, 60. Belt 23 is driven by motor 37.

It motor drive 60 delivers enough torque, motor drive 59 could be omitted.

The following table lists the parts numbers and parts descriptions as used herein and in the drawings attached hereto.

PARTS LIST

| Part Number | Description |
| --- | --- |
| 10 | crawfish peeling apparatus |
| 11 | frame |
| 12 | exoskeleton |
| 13 | crawfish |
| 14 | head section |
| 15 | tail section |
| 16 | crawfish tail meat |
| 17 | guide platform |
| 18 | flat surface |
| 19 | joint |
| 20 | carrier belt assembly |
| 21 | carrier belt drive wheel |
| 22 | carrier belt idler wheel |
| 23 | carrier belt |
| 24 | annular groove |
| 25 | center of rotation |
| 26 | center of rotation |
| 27 | peripheral recess |
| 28 | lower roller position |
| 29 | upper roller position |
| 30 | stabilization belt assembly |
| 31 | belt drive wheel |
| 32 | primary stabilization belt |
| 33 | secondary stabilization belt |
| 34 | belt tensioner |
| 35 | belt idler |
| 36 | belt idler |
| 37 | belt drive motor |
| 38 | pushrod |
| 39 | aperture in wall 41 |
| 40 | base assembly |
| 41 | support wall |
| 42 | ramp |
| 43 | barrel |
| 44 | arrow |
| 45 | arrow |
| 46 | roller elevated position |
| 50 | roller assembly |
| 51 | upper roller |
| 52 | lower roller |
| 53 | de-heading piston |
| 54 | de-heading wheel |
| 55 | needle |
| 56 | needle spring |
| 57 | positioning actuator |
| 58 | upper roller swing arm |

-continued

PARTS LIST

| Part Number | Description |
| --- | --- |
| 59 | upper roller drive motor |
| 60 | lower roller drive motor |
| 61 | lower roller pressure connection |
| 62 | proximity sensor |
| 63 | needle air feed tube |

The present invention could be used to peel other crustacea similar to crawfish, such as rock lobsters.

The foregoing embodiments are presented by way of example only; the scope of the present invention is to be limited only by the following claims.

We claim:

1. A crawfish peeling apparatus comprising:
   a) a machine frame;
   b) a pair of rollers mounted on the frame, each roller having an axis of rotation that moves relative to the other axis of rotation during use;
   c) a conveyor for transporting crawfish to be peeled, the conveyor having first and second end portions, the conveyor having a moving portion that enables crawfish that are placed on the conveyor to travel to the pair of rollers, and the conveyor including a plurality of belts for transporting crawfish and simultaneously straightening the tail section of the crawfish; and
   e) an alignment member for aligning the crawfish tail with the rollers in a position that enables the rollers to grip and pinch the crawfish tail exoskeleton and discharge the edible meat product therefrom.

2. The crawfish peeler of claim 1 further comprising a mechanism for separating the head and tail sections of the crawfish before the tail section is further processed.

3. The crawfish peeler of claim 2 wherein the mechanism includes a pushrod.

4. The crawfish peeler of claim 1 wherein the conveyor is generally rounded in transverse cross section.

5. The crawfish peeler of claim 1 wherein the rollers have annular grooves.

6. The crawfish peeler of claim 1 wherein the frame supports an inclined plate section that assists in straightening the tail section of the crawfish exoskeleton.

7. A crawfish peeling apparatus comprising:
   a) a machine frame;
   b) a pair of rollers mounted on the frame;
   c) a conveyor for transporting crawfish to be peeled, the conveyor having first and second end portions, the conveyor having a moving portion that enables crawfish that are placed on the conveyor to travel to the pair of rollers, and the conveyor including a plurality of belts for transporting crawfish and simultaneously straightening the tail section of the crawfish; and
   d) an alignment member for aligning the crawfish tail with the rollers in a position that enables the rollers to grip and pinch the crawfish tail exoskeleton and discharge the edible meat product therefrom;
   e) a backstop that limits movement of crawfish on the conveyor.

8. The crawfish peeler of claim 7 wherein the backstop is positioned next to the peeler mechanism.

9. The crawfish peeler of claim 1 wherein the inclined plate gradually straightens the crawfish tail exoskeleton as the conveyor transports the crawfish.

10. A crawfish peeling apparatus comprising:

a) a machine frame;

b) a pair of rollers mounted on the frame, the peeler mechanism including at least one roller with an axis of rotation that moves relative to the frame; and c) a conveyor for transporting crawfish to be peeled, the conveyor having first and second end portions, the conveyor having a moving portion that enables crawfish that are placed on the conveyor to travel to the peeler mechanism, wherein the frame member includes a plate member that straightens the tail section of the crawfish before it is peeled by the peeler mechanism, and the peeler mechanism includes an alignment member for aligning the crawfish tail with the roller in a position that enables the rollers to grip and pinch the crawfish tail exoskeleton and discharge the edible meat product therefrom.

11. The crawfish peeling apparatus of claim 10 wherein the peeler mechanism comprises a pair of rollers that rotate a partial revolution during a peeling of the crawfish.

12. The crawfish peeling apparatus of claim 10 wherein the conveyor comprises multiple conveyor belts.

13. The crawfish peeling apparatus of claim 10 wherein the conveyor is generally rounded in transverse cross section.

14. The crawfish peeling apparatus of claim 10 wherein the conveyor includes a pair of belts that are positioned one above the other.

15. The crawfish peeling apparatus of claim 10 wherein the conveyor includes a pair of belts that are positioned one above the other, the crawfish being transported in between the belts.

16. The crawfish peeling apparatus of claim 10 further comprising a guide for straightening the tail section of the crawfish as the crawfish travels upon the conveyor.

17. The crawfish peeling apparatus of claim 16 wherein the guide includes an inclined plate.

18. The crawfish peeling apparatus of claim 17 wherein the inclined plate is positioned next to the conveyor and is configured to gradually straighten the tail section of the crawfish as the crawfish travels upon the conveyor.

19. The crawfish peeling apparatus of claim 10 further comprising a stop member for holding the crawfish next to the peeler mechanism once the crawfish reaches the peeler mechanism via the conveyor.

20. A crawfish peeling apparatus comprising:

a) a machine frame;

b) a peeler mechanism mounted on the frame, the peeler mechanism having means for pinching the exoskeleton at a position that discharges the edible meat product from the skeleton; and c) a conveyor mechanism for transporting crawfish to be peeled, the conveyor including a plurality of belts for transporting crawfish and simultaneously straightening the tail section of the crawfish, the conveyor mechanism having a first belt with first and second end portions, the first belt including a moving portion that enables crawfish that are placed on the first belt to travel to the peeler mechanism, and the conveyor mechanism including a second belt for straightening the tail section of the crawfish before it is peeled; and d) a backstop that limits movement of the crawfish on the conveyor.

21. A method of peeling crawfish having head and tail sections, comprising the steps of:

a) conveying the crawfish upon a conveyor between loading and peeling positions;

b) gradually straightening the crawfish tail section as it is conveyed along the conveyor;

c) separating the head and tail sections of the crawfish; and d) peeling the crawfish tail section to separate the edible meat portion from the exoskeleton.

22. The method of claim 21 wherein in step "a" the crawfish is supported by its tail section upon the conveyor.

23. The method of claim 21 further comprising the step of using the conveyor to hold the crawfish in between two belt sections of the conveyor as it is conveyed toward the peeling position.

24. The method of claim 21 wherein in step "d" the crawfish is peeled by pinching the tail section with a pair of rollers.

25. A method of peeling crawfish having head and tail sections, comprising the steps of:

a) conveying the crawfish upon a conveyor between loading and peeling positions, the conveyor comprising at least one endless belt;

b) gradually straightening the crawfish tail section in step "a" as the crawfish is conveyed along the conveyor:

c) separating the head and tail sections of the crawfish at the peeling position; and d) peeling the crawfish tail section at the peeling position to separate the edible meat portion from the exoskeleton.

26. The method of claim 25 wherein the conveyor in step "a" includes a pair of conveyors and further comprising the step of gripping the crawfish in between the conveyors.

27. The method of claim 26 wherein the conveyors are positioned generally above and below the crawfish.

28. The method of claim 25 further comprising the step of stopping movement of the crawfish upon the conveyor when the crawfish reaches the peeling position.

29. The method of claim 25 further comprising the step of straightening the crawfish tail section as it is conveyed in step "a".

30. The method of claim 25 further comprising the step of supporting the crawfish by its tail section upon the conveyor.

* * * * *